C. T. Gravatt,
Door Check.
No. 100,616.     Patented Mar. 8, 1870.
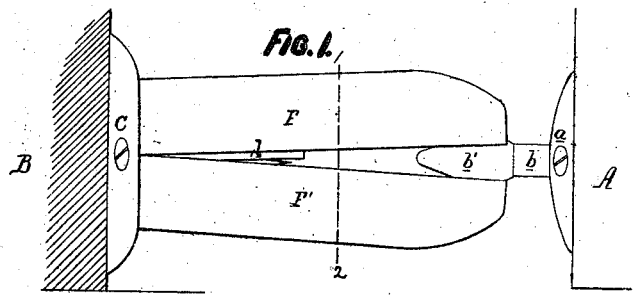
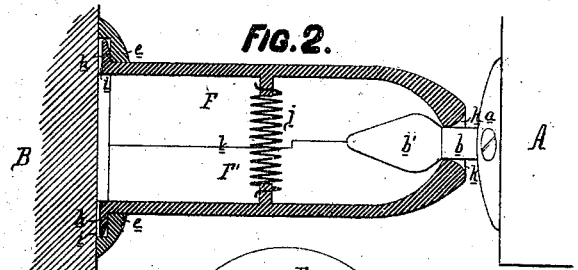
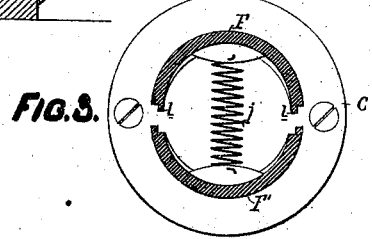
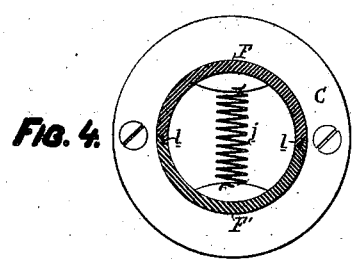
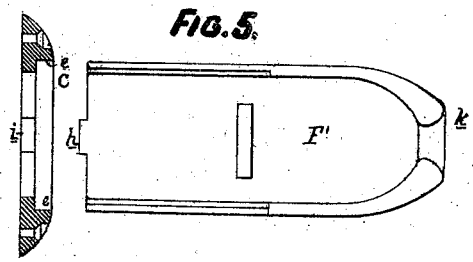
WITNESSES.

UNITED STATES PATENT OFFICE.

CHARLES T. GRAVATT, OF PHILADELPHIA, PENNSYLVANIA.

IMPROVEMENT IN DOOR-RETAINERS.

Specification forming part of Letters Patent No. 100,616, dated March 8, 1870.

*To all whom it may concern:*

Be it known that I, CHARLES T. GRAVATT, of Philadelphia, county of Philadelphia, State of Pennsylvania, have invented an Improved Door-Retainer, of which the following is a specification.

My invention consists of two movable jaws connected together by a suitable spring, and hinged or otherwise attached to a disk or plate, in combination with a pin having a double-inclined head arranged to pass between and to be grasped by the said jaws, the pin being attached to a door and the jaws to an adjacent wall or wash-board, so that when the door is thrown open its pin shall be caught and held by the said jaws in the manner fully described hereinafter.

In the accompanying drawings, Figure 1 is a side view of my improved door-retaining device; Fig. 2, a sectional view of the same; Figs. 3 and 4, transverse sections on the line 1 2, Fig. 1; and Fig. 5, a sectional plan view of a portion of Fig. 1, showing the parts detached from each other.

A represents a portion of a door, and B that portion of the adjacent wall or wash-board with which the door is brought in contact when thrown open.

A plate, $a$, is secured to one side of the door, close to the outer edge of the same, and from this plate projects a pin, $b$, which is enlarged at its outer end, so as to form a double-inclined head, $b'$, as clearly represented in the drawings. A plate or disk, C, is secured to the wash-board B at a point directly opposite to the plate $a$ of the door when the latter is open, and the back of this disk is recessed for the reception of lugs $h$ at the ends of two hollow semicircular jaws, F and F', which are thus so hinged to the disk that they can be opened to a limited extent. The jaws are connected together by a spiral or other spring, $j$, which has a tendency to hold them together, but which will permit the said jaws to be opened slightly, or to an extent sufficient to admit the tapering head $b'$ of the pin $b$, the end of each of the jaws having a beveled recess, $k$, as best observed in Figs. 2 and 5, for the purpose of facilitating the introduction of the said pin between the jaws when the door is thrown back. The shoulders $e\ e$ of the disk C and two projections, $l\ l$, on the jaw F, which are adapted to corresponding recesses on the jaw F', prevent the lateral displacement of either of the said jaws. When the door is thrown back, so as to cause its headed pin $b$ to slightly open and pass between the jaws, the latter will, owing to their spring $j$, instantly close upon the pin, as shown in Fig. 2, and retain the same until, by a slight effort exerted in closing the door, the pin is withdrawn from between the said jaws.

Although I prefer connecting the jaws to the disk C in the manner described, they may be simply hinged to the same or to any suitable plate without departing from the main feature of my invention.

The two jaws, when closed together, much resemble the ordinary fenders which are used to prevent a door, when thrown open, from striking against the adjacent wall, and they serve the purpose of a fender as well as that for which they are principally intended.

I claim—

1. The jaws F F', constructed, as described, of rigid material, hung to a plate, C, and connected by a spring, $j$, inclosed within the jaws, in combination with the pin $b$, having a double-inclined head, $b'$, which the jaws are caused to grasp by the action of the spring, as specified.

2. The shoulders $e\ e$ of the disk, and projections and recesses $l\ l$, arranged to prevent the lateral displacement of the jaws, substantially as set forth.

In testimony whereof I have signed my name to this specification in the presence of two subscribing witnesses.

CHARLES T. GRAVATT.

Witnesses:
LOUIS BOSWELL,
HARRY SMITH.